(12) United States Patent
Kertes et al.

(10) Patent No.: US 11,750,084 B2
(45) Date of Patent: Sep. 5, 2023

(54) APPARATUS AND METHOD FOR ACTIVELY DISCHARGING A DC LINK CAPACITOR

(71) Applicant: Volkswagen Aktiengesellschaft, Wolfsburg (DE)

(72) Inventors: Marko Kertes, Munich (DE); Markus Novotny, Zierenberg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 102 days.

(21) Appl. No.: 17/377,037

(22) Filed: Jul. 15, 2021

(65) Prior Publication Data

US 2022/0021291 A1 Jan. 20, 2022

(30) Foreign Application Priority Data

Jul. 15, 2020 (DE) ...................... 10 2020 208 826.8

(51) Int. Cl.
*H02M 1/32* (2007.01)
(52) U.S. Cl.
CPC .................................. *H02M 1/322* (2021.05)
(58) Field of Classification Search
CPC .................................................... H02M 1/322
See application file for complete search history.

(56) References Cited

U.S. PATENT DOCUMENTS

| 2006/0203400 | A1* | 9/2006 | Bodano | ............... | H01L 27/0658 |
| | | | | | 257/E23.044 |
| 2011/0080149 | A1* | 4/2011 | Fukuta | .................... | H02M 1/36 |
| | | | | | 323/284 |
| 2020/0039379 | A1* | 2/2020 | Schlosser | ............ | H02J 7/00309 |

FOREIGN PATENT DOCUMENTS

DE 102017218429 A1 4/2019

* cited by examiner

*Primary Examiner* — Peter M Novak
(74) *Attorney, Agent, or Firm* — Muncy, Geissler, Olds & Lowe, P.C.

(57) ABSTRACT

An apparatus for actively discharging at least one DC link capacitor, comprising at least one half-bridge circuit having a high-side transistor and a low-side transistor, wherein the half-bridge circuit is arranged in parallel with the DC link capacitor, wherein a voltage divider comprising at least two resistors is arranged in parallel with the DC link capacitor, wherein a tap of the voltage divider is connected to at least one differentiator, wherein at least one driver module for generating gate driver signals is assigned to the half-bridge circuit, and at least one control unit, wherein the control unit is designed in such a way that, in an active discharge mode, at least one transistor of the half-bridge circuit is controlled as a function of an output signal of the differentiator, as well as to an associated method.

9 Claims, 1 Drawing Sheet

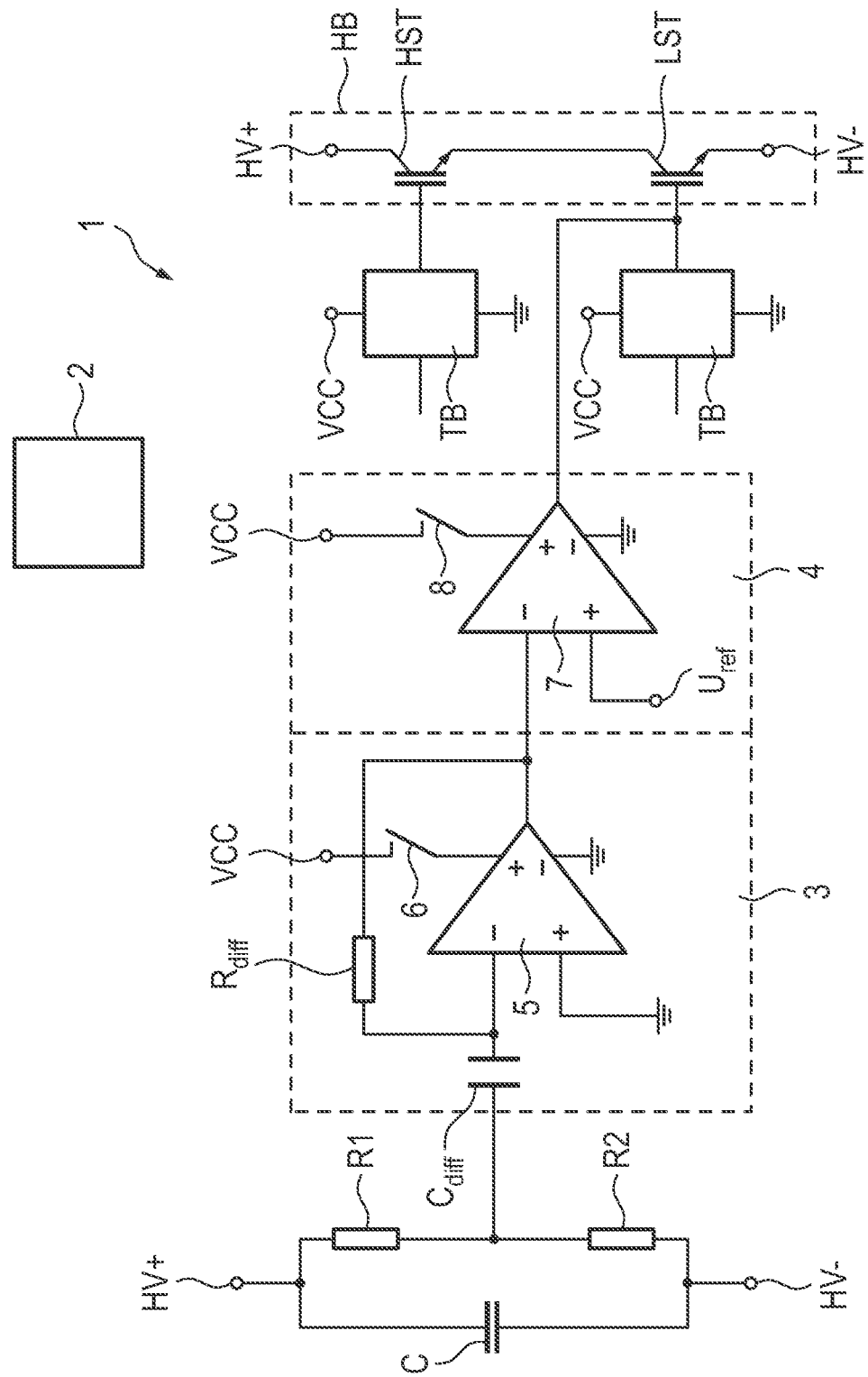

APPARATUS AND METHOD FOR ACTIVELY DISCHARGING A DC LINK CAPACITOR

This nonprovisional application claims priority under 35 U.S.C. § 119(a) to German Patent Application No. 10 2020 208 826.8, which was filed in Germany on Jul. 15, 2020 and which is herein incorporated by reference.

BACKGROUND OF THE INVENTION

Field of the Invention

The present invention relates to an apparatus and method for actively discharging a DC link capacitor.

Description of the Background Art

DC link capacitors are used, for example, in traction networks of electric or hybrid vehicles, where they are arranged between a traction battery and an inverter for an electric machine. Particularly in high-voltage systems, where voltages of over 60 V are used, a fast and reliable discharge of the DC link capacitor is necessary, for example when the system is switched off in a crash. One way of actively discharging is to connect a resistive load that converts the energy stored in the DC link capacitor into heat. The demands placed on the load in this case are not unproblematic, since the currents can become very large and the heat that is generated must be dissipated.

SUMMARY OF THE INVENTION

It is therefore an object of the present invention to provide an improved apparatus for actively discharging a DC link capacitor and providing a suitable method.

In an exemplary embodiment, the apparatus for actively discharging at least one DC link capacitor comprises at least one half-bridge circuit with a high-side transistor and a low-side transistor, wherein the half-bridge circuit is arranged in parallel with the DC link capacitor. Further, a voltage divider comprising at least two resistors is arranged in parallel with the DC link capacitor, wherein a tap of the voltage divider is connected to at least one differential element or differentiator. At least one driver module for generating gate driver signals is associated with the half-bridge circuit, as well as at least one control unit, the control unit being designed in such a way that, in an active discharge mode, it controls at least one transistor of the half-bridge circuit as a function of an output signal of the differentiator. The advantages of the apparatus can be summarized as follows. Due to the high currents in normal operation, the transistors of the half-bridge circuit are very well thermally coupled to dissipate the heat loss. On the other hand, they cannot be operated in a permanent short circuit since they could then be destroyed. Via the differentiator, the discharge current of the DC link capacitor is now determined without direct current measurement, since said discharge current is proportional to the change in voltage at the DC link capacitor over time. If the current subsequently becomes too large, at least one transistor can then be controlled accordingly to limit the current flow. In principle, the control can be continuous.

Preferably, however, the control can be pulse-shaped as in normal operation. For this purpose, a comparator is arranged downstream of the differentiator, wherein in the active discharge mode the at least one transistor is controlled as a function of an output signal of the comparator. The transistor is clearly activated as long as the output voltage of the differentiator is smaller than a reference voltage. If the output voltage of the differentiator exceeds the reference voltage, the transistor is temporarily disabled until the output voltage of the differentiator has fallen below the reference voltage again. This represents a closed control circuit.

A switching element can be assigned to the differentiator and/or the comparator, with the control unit being designed in such a way that the differentiator and/or the comparator are switched on via the switching element in the active discharge mode and switched off outside the active discharge mode, so that energy is saved, and possible feedback effects are avoided. Preferably, the supply voltage is switched on or off via the switching element.

The differentiator and/or comparator can be an operational amplifier circuit.

In an example, only one differentiator for one transistor may be assigned to the half-bridge circuit, wherein the control unit is designed in such a way that the other transistor is permanently switched through during the active discharge mode. This reduces the amount of circuitry required. If the permanent through-connection is performed by means of the driver module for normal operation, short-circuit monitoring is ensured at the same time.

The differentiator can be associated with the low-side transistor.

If a plurality of half-bridge circuits is present, it is sufficient in principle to use only one half-bridge circuit for the active discharge. However, it is possible to assign a differentiator to at least one additional half-bridge circuit or even to all half-bridge circuits. The advantage is a redundancy, as well as the possibility to distribute the load of the half bridges.

An exemplary application of the apparatus is for use in a traction network of a motor vehicle.

The differentiator and/or the comparator can be integrated in a driver module of at least one transistor of the half-bridge circuit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole FIGURE schematically shows an apparatus according to an exemplary embodiment of the invention.

DETAILED DESCRIPTION

The FIG. 1 schematically shows an apparatus 1 for active discharging of a DC link capacitor C. The DC link capacitor C is located between a positive high-voltage terminal HV+ and a negative high-voltage terminal HV−. A half-bridge circuit HB with a high-side transistor HST and a low-side transistor LST is arranged in parallel with the DC link capacitor C. For clarity, the freewheeling diodes are not shown. The gate terminals of the high-side transistor HST and the low-side transistor LST are each assigned a driver module TB, each of which contains driver circuits for generating gate driver signals. However, the driver circuits can also be integrated in a common driver module. The driver modules TB are controlled by a control unit 2. Further, a voltage divider with two resistors R1, R2 is arranged in parallel with the DC link capacitor C. Further, the apparatus 1 has a differentiator 3 as well as a comparator 4, both of which are designed as operational amplifier circuits. The operational amplifier 5 of the differentiator 3 is connected as a classical differentiator with an input capacitance $C_{diff}$ and a resistor $R_{diff}$ in the feedback branch. In this case, the differentiator 3 has a switching element 6 between a supply voltage terminal of the operational amplifier 5 and the supply voltage VCC, which is controlled by the control unit 2. The input of the differentiator 3 is connected to the center tap of the voltage divider. Accordingly, the output voltage of differentiator 3 is calculated to be $U_A = -R_{diff} \cdot C_{diff} \cdot dU/dt$. This represents an image of the discharge current of the DC link capacitor C. The output of the differentiator 3 is connected to the negative input of the operational amplifier 7 of the comparator 4, to the positive input of which a reference voltage $U_{ref}$ is applied. A switching element 8 is also arranged at the supply voltage terminal of the operational amplifier 7, which is also controlled by the control unit 2. The output of the comparator 4 is connected (possibly via a decoupling element, not shown, such as a diode) to the gate terminal of the low-side transistor LST.

In normal operation, the control unit 2 opens the switching elements 6 and 8 so that differentiator 3 and comparator 4 are switched off. If the control unit 2 now detects a situation where the DC link capacitor C is to be actively discharged, the control unit 2 switches the driver module TB of the low-side transistor LST off, or to high impedance, and closes the switches 6, 8. Furthermore, the control unit 2 controls the driver module TB of the high-side transistor HST in such a way that it permanently switches through the high-side transistor HST. Initially, the voltage change at the DC link capacitor C is negligible, so that the comparator 4 switches through the low-side transistor LST. Thus, both transistors are connected through, and a large current flows so that the voltage change at the DC link capacitor C becomes larger. This leads to an increasing output voltage at the differentiator 3. If the output voltage at the differentiator 3 then reaches the reference voltage $U_{ref}$ at the comparator 4, the latter switches off the low-side transistor LST. As a result, the voltage change at the DC link capacitor C becomes smaller, since the half-bridge circuit HB blocks. If the output voltage at the differentiator 3 then drops below the reference voltage $U_{ref}$, the low-side transistor LST is switched on again. This is repeated until the DC link capacitor C is discharged to a predetermined voltage. The advantage of the circuit is that it uses robust analog technology, is self-regulating, uses an existing thermal link, and is very fast.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for actively discharging at least one DC link capacitor, the apparatus comprising:
   at least one half-bridge circuit having a high-side transistor and a low-side transistor, the half-bridge circuit being arranged in parallel with the DC link capacitor;
   a voltage divider comprising at least two resistors is arranged in parallel with the DC link capacitor;
   a tap of the voltage divider being connected to at least one differentiator;
   at least one driver module to generate gate driver signals is assigned to the half-bridge circuit; and
   at least one control unit configured such that, in an active discharge mode, the control unit controls at least one of the transistors of the half-bridge circuit as a function of an output signal of the differentiator,
   wherein the half-bridge circuit is assigned only one differentiator associated with one of the transistors,
   wherein the control unit is designed such that the other one of the transistors is permanently switched through during the active discharge mode.

2. The apparatus according to claim 1, wherein a comparator is arranged downstream of the differentiator, wherein the at least one of transistors is controlled in the active discharge mode as a function of an output signal of the comparator.

3. The apparatus according to claim 2, wherein a respective switching element is assigned to each of the differentiator and the comparator, wherein the control unit is designed such that the differentiator and the comparator are switched on via the respective switching elements in the active discharge mode and switched off outside the active discharge mode.

4. The apparatus according to claim 2, wherein the differentiator and the comparator are each designed as an operational amplifier circuit.

5. The apparatus according to claim 1, wherein the one of the transistors associated with the only one differentiator is the low-side transistor of the half-bridge circuit.

6. The apparatus according to claim 1, wherein the half-bridge circuit includes a plurality of half-bridge circuits that are connected in parallel, and wherein at least two of the plurality of half-bridge circuits are assigned a differentiator.

7. The apparatus according to claim 1, wherein the apparatus is arranged in a traction network of a motor vehicle.

8. The apparatus according to claim 2, wherein at least one of the differentiator or the comparator are integrated in a driver module of at least one transistor of the at least one half-bridge circuit.

9. A method for actively discharging a DC link capacitor via at least one control unit, at least one half-bridge circuit having a high-side transistor and a low-side transistor, at least one voltage divider and at least one differentiator, the method comprising:
   detecting by the control unit a need for active discharge of the DC link capacitor; and
   controlling at least one of the transistors of the half-bridge circuit as a function of an output signal of the differentiator,
   wherein the half-bridge circuit is assigned only one differentiator associated with one of the transistors
   wherein the control unit is designed such that the other one of the transistors is permanently switched through during the active discharge mode.

* * * * *